United States Patent
Narayanamurthy

(10) Patent No.: US 8,790,451 B1
(45) Date of Patent: Jul. 29, 2014

(54) METHOD AND SYSTEM FOR INTEGRATED HOME COOLING UTILIZING SOLAR POWER

(75) Inventor: Ramachandran Narayanamurthy, El Cerrito, CA (US)

(73) Assignee: PVT Solar, Inc., Fremont, CA (US)

( * ) Notice: Subject to any disclaimer, the term of this patent is extended or adjusted under 35 U.S.C. 154(b) by 225 days.

(21) Appl. No.: 13/235,338

(22) Filed: Sep. 16, 2011

Related U.S. Application Data

(60) Provisional application No. 61/384,142, filed on Sep. 17, 2010.

(51) Int. Cl.
*B01D 53/06* (2006.01)
*F24F 3/147* (2006.01)

(52) U.S. Cl.
USPC ............... 96/111; 96/112; 96/118; 96/125; 96/127; 62/271

(58) Field of Classification Search
USPC ........... 96/109, 111, 112, 115, 118, 125–127; 95/10, 14–18, 113; 62/94, 271
See application file for complete search history.

(56) References Cited

U.S. PATENT DOCUMENTS

| | | | | |
|---|---|---|---|---|
| 4,180,126 A | * | 12/1979 | Rush et al. ...................... | 165/59 |
| 4,180,985 A | * | 1/1980 | Northrup, Jr. ..................... | 62/94 |
| 4,222,244 A | * | 9/1980 | Meckler ........................ | 62/235.1 |
| 4,287,721 A | * | 9/1981 | Robison ............................. | 62/94 |
| 5,782,104 A | * | 7/1998 | Sami et al. ........................ | 62/271 |
| 6,050,100 A | * | 4/2000 | Belding et al. ................... | 62/271 |
| 6,513,339 B1 | * | 2/2003 | Kopko .............................. | 62/94 |
| 6,915,655 B2 | * | 7/2005 | Lee et al. .......................... | 62/271 |
| 2005/0252229 A1 | * | 11/2005 | Moratalla ......................... | 62/271 |
| 2007/0028769 A1 | * | 2/2007 | Eplee et al. ....................... | 95/113 |
| 2008/0289500 A1 | * | 11/2008 | Eisenberger et al. ........... | 95/139 |
| 2010/0192605 A1 | * | 8/2010 | Fang et al. .................... | 62/235.1 |
| 2011/0056220 A1 | * | 3/2011 | Caggiano .......................... | 62/94 |
| 2011/0257795 A1 | * | 10/2011 | Narayanamurthy et al. . | 700/277 |
| 2012/0295534 A1 | * | 11/2012 | Narayanamurthy et al. . | 454/256 |

FOREIGN PATENT DOCUMENTS

JP     2003-106562 A   *   4/2003

OTHER PUBLICATIONS

Machine generated English translation of JP 2003-106562 A, published Apr. 2003.*

* cited by examiner

*Primary Examiner* — Frank Lawrence
(74) *Attorney, Agent, or Firm* — Armstrong Teasdale LLP

(57) ABSTRACT

A system for utilizing solar energy for home utility supply includes an air collector coupled to a solar module disposed to collect ambient air carrying thermal energy generated from the solar module. The system includes an energy transfer module (ETM) comprising a first heat-exchanger configured to process a first air stream from the air collector and output a second air stream carrying a portion of the thermal energy. Additionally, the system includes an air-conditioning module for processing a third air stream from interior space. The system includes an air processor comprising a desiccant material to pre-condition the third air stream utilizing the second air stream in the ETM and form a fourth air stream for the air-conditioning module and a fifth air stream in the ETM. Furthermore, the system uses a second heat-exchanger to process the fourth air stream and form a six air stream with reduced temperature and humidity.

29 Claims, 6 Drawing Sheets

METHOD AND SYSTEM FOR INTEGRATED HOME COOLING UTILIZING SOLAR POWER

CROSS-REFERENCES TO RELATED APPLICATIONS

This application claims priority to U.S. Provisional Patent Application No. 61/384,142, filed Sep. 17, 2010, commonly owned and incorporated by reference in its entirety for all purposes.

BACKGROUND OF THE INVENTION

The present invention relates to a solar power utilization technique. More particularly, the present invention provides a method and system for utilizing solar thermal energy for integrated home utility supply including space heating, water heating, air ventilation, and air conditioning. Merely, by way of example, the present invention has been applied to demonstrate performance of an integrated thermal system coupled to a solar module for providing all season's energy utilization required for a target home/building, but it would be recognized that the invention has a much broader range of applications.

Over the past centuries, the world population of human beings has exploded. Along with the population, demand for resources has also grown explosively. Such resources include raw materials such as wood, iron, and copper and energy, such as fossil fuels, including coal and oil. Industrial countries world wide project more increases in oil consumption for transportation and heating purposes, especially from developing nations such as China and India. Obviously, our daily lives depend, for the most part, upon oil or other fossil fuels, which are being depleted and becoming increasingly scarce.

Along with the depletion of our fossil fuel resources, our planet has experienced a global warming phenomena, known as "global warming," which was brought to our foremost attention by Al Gore, who is the former Vice President of the United States of America. Global warming is known as an increase in the average temperature of the Earth's air near its surface, which is projected to continue to increase at a rapid pace. Warming is believed to be caused by greenhouse gases, which are derived, in part, from use of fossil fuels. The increase in temperature is expected to cause extreme weather conditions and a drastic size reduction of the polar ice caps, which in turn will lead to higher sea levels and an increase in the rate of warming. Ultimately, other effects include mass species extinctions, and possibly other uncertainties that may be detrimental to human beings.

Much if not all of the useful energy found on the Earth comes from our sun. Generally all common plant life on the Earth achieves life using photosynthesis processes from sun light. Fossil fuels such as oil were also developed from biological materials derived from energy associated with the sun. For most living beings on the Earth, sunlight has been essential. Likewise, the sun has been our most important energy source and fuel for modern day solar energy. Solar energy possesses many characteristics that are very desirable! Solar energy is renewable, clean, abundant, and often readily available.

As an example, solar panels have been developed to convert sunlight into utility energy. As merely an example, solar thermal panels often convert electromagnetic radiation from the sun light into thermal energy for heating homes, running certain industrial processes, or driving high grade turbines to generate electricity. As another example, solar photovoltaic panels convert sunlight directly into electricity for a variety of applications. Solar photovoltaic panels are generally composed of an array of solar cells, which are interconnected to each other. During the operation of converting light to electricity, solar cells also generate high percentage of power in a form of thermal energy. Accordingly, solar panels formed in any combination of thermal modules and photovoltaic modules can generate low cost clean thermal energy with great potential to benefit our nation, security, and human users. They can diversify our energy requirements, reduce the world's dependence on oil and other potentially detrimental sources of energy, and substantially reduce green house gases release into atmosphere.

Although solar panels have been used successful for certain applications, there are still certain limitations. Typical photovoltaic modules are just used to convert sunlight into electricity while let all thermal energy generated (passively) wasted. To some degrees, the extra thermal energy (under the photovoltaic PV modules) may cause performance degradation of the PV cells and cause high temperature of a roof where the PV modules are mounted on. Depending upon the geographic regions, the drawbacks mentioned above may contribute to be part of a big hurdle for installing relative costly PV panels to compete with the direct purchase of electricity from public power companies. These and other limitations are described throughout the present specification, and may be described in more detail below.

From the above, it is seen that an improved technique of effectively utilizing the thermal energy generated by the solar panels for an integrated home conditioning is highly desired.

BRIEF SUMMARY OF THE INVENTION

The present invention relates to a solar power utilization technique. More particularly, the present invention provides a method and a thermal solar system for utilizing thermal energy generated by solar modules for integrated home space heating, water heating, home ventilation, and air conditioning/cooling. Merely, by way of example, the present invention provides an integrated system associated with a solar module mounted on a roof of a building for processing external heated air and conditioning internal air, but it would be recognized that the invention has a much broader range of applications.

In a specific embodiment, the present invention provides a system for utilizing solar thermal energy for integrated home utility supply. The system includes an air collector coupled to a solar module disposed outside a building to collect external air carrying thermal energy generated from the solar module. The system further includes an energy transfer module comprising a first heat exchanger disposed in a first pathway between a first air inlet and a first air outlet. The first air inlet is coupled to the air collector for receiving a first air stream carrying a portion of the thermal energy. The first heat exchanger is configured to process the first air stream and output a second air stream carrying at least partially the portion of the thermal energy. Additionally, the system includes an air conditioning module comprising a second heat exchanger disposed in a second pathway between a second air inlet and a second air outlet. The second air inlet is coupled to interior space of the building for drawing a third air stream characterized by a first humidity and a first temperature. Furthermore, the system includes an air processor comprising a desiccant material coupled to both the energy transfer module and the air conditioning module. The air processor is configured to continuously cycle the desiccant material in the first pathway located after the first heat exchanger and alternatively in the second pathway located before the second heat exchanger. In an embodiment, the desiccant material absorbs moisture from the third air stream in the second pathway to deliver a fourth air stream to the second heat exchanger and releases the moisture to the second air stream in the first pathway to deliver a fifth air stream to the first air outlet. The second heat exchanger processes the fourth air stream to form a sixth air stream characterized by a second humidity and a second temperature towards the second air outlet. The second humidity is no greater than the first humidity and the second temperature is lower than the first temperature.

In an alternative embodiment, a system for utilizing solar energy for integrated building utility supply is provided. The system includes a solar module mounted over a roof of a building and an air plenum associated with the solar module for collecting ambient air from external space of the building. Additionally, the system includes an energy transfer module comprising a first air inlet, an air filter, a heat exchanger, a blower, a desiccant medium, and a first air outlet disposed along a first channel structure. The first air inlet connects the air plenum for the blower to draw a first airflow of the ambient air carried an amount of thermal energy generated by the solar module. The heat exchanger is configured to utilize a portion of the amount of thermal energy to form a second airflow. The desiccant medium is configured to utilize at least partially a remaining portion of the amount of thermal energy in the second airflow. Furthermore, the system includes an air conditioning module comprising a second air inlet, the desiccant medium, an evaporative cooler, and a second air outlet disposed along a second channel structure. The second air inlet is coupled to internal space of the building for drawing a third airflow. The desiccant medium is configured to process the third airflow for the evaporative cooler. The system further includes a rotary device configured to continuously exposing a portion of the desiccant medium in the second channel structure and a remaining portion of the desiccant medium in the first channel structure in a periodic cycle. Moreover, the system includes a controller coupled to the energy transfer module, the air conditioning module, and the rotary device for controlling integrated utility supply of the building.

Many benefits over conventional techniques are achieved by applying the present invention to provide home utility supply. For example, the present technique provides a method and system for utilizing substantial amount of solar power produced by a solar module including electric power from photovoltaic module and a major portion of thermal energy produced by both photovoltaic module and thermal solar module. Additionally, the present invention provides an integrated solar thermal system for providing substantially healthier home utility supply and echo-friendly air conditioning. By coupling an air collector directly to the solar module to form a heated air stream, the thermal system according to one or more embodiments uses an energy transfer module to directly process the heated air stream for water heating through a heat exchanger. The system further includes an air conditioning module to cool the interior air. The interior air can be pre-conditioned using a desiccant material coupled to both the energy transfer module and the air conditioning module for reducing humidity level assisted by the warm exhaust air stream in the energy transfer module. The pre-conditioned air can be cooled using a low-energy evaporative cooler which substantially utilizes self-generated electric and thermal power from the solar module and very echo-friendly by using water as work fluid. Alternatively, the same thermal solar system can be operated to drive the work airflow in a reversed direction for mechanically venting indoor air depending on interior air condition measured by a plurality of sensors. Additionally, the system can be under fully automatic control by a microprocessor based controller to set flow rate of the work air stream and control water heating efficiency, dehumidification effect, and cooling efficiency. In a preferred embodiment, the overall energy conversion efficiency of the integrated thermal solar system can be substantially enhanced and with the advanced automatic control this system is able to provide full-scale integrated home utility supply and echo-friendly air conditioning/ventilation. Depending upon the embodiments, one or more of these benefits may be achieved. These and other benefits will be described in more detail throughout the present specification and more particularly below.

Various additional objects, features and advantages of the present invention can be more fully appreciated with reference to the detailed description and accompanying drawings that follow.

DETAILED DESCRIPTION OF THE INVENTION

The present invention relates to an energy transfer technique. More particularly, the present invention provides a thermal system for delivering solar panel generated thermal energy to a home for integrated utility supply including space heating, hot water supply, air cooling, and ventilation. Merely, by way of example, the present invention has been applied to demonstrate thermal energy utilization of an energy transfer module coupled with an air plenum structure associated with a solar array on the roof, but it would be recognized that the invention has a much broader range of applications.

Figure 1:
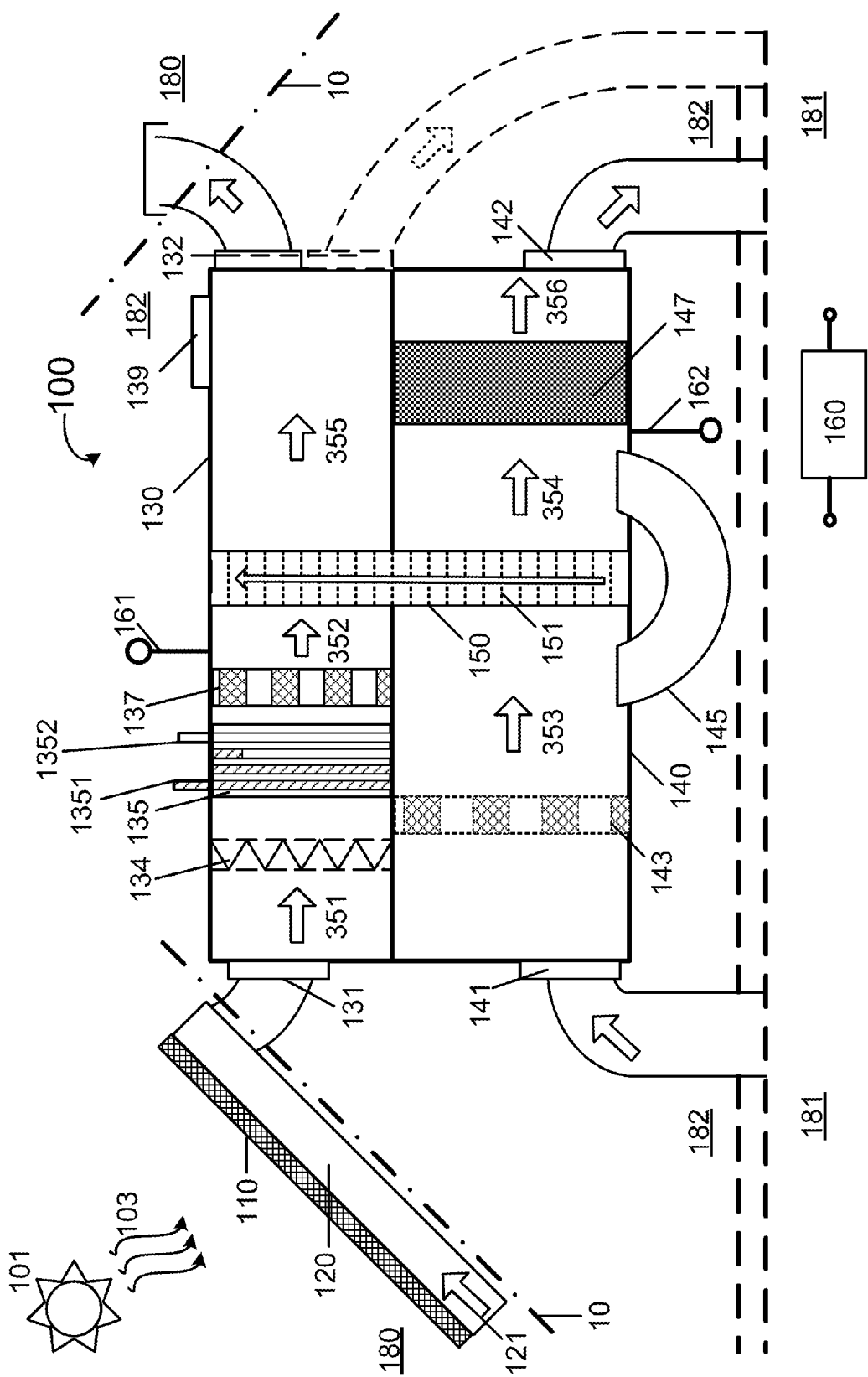
FIG. 1 is a simplified diagram of a thermal system for integrated home utility supply and conditioning according to an embodiment of the present invention.

FIG. 1 is a simplified diagram of a thermal system for integrated home utility supply and conditioning according to an embodiment of the present invention. This diagram is merely an example, which should not unduly limit the scope of the claims herein. One of ordinary skill in the art would recognize other variations, modifications, and alternatives. As shown, the thermal system 100 for providing an integrated home utility supply and echo air conditioning is associated with a solar module 110 mounted outside a building. For example, the solar module 100 is mounted on a roof 10 via a rack fixture such as a CleanLine™ mounting system provided by PVT Solar Inc. In a specific embodiment, the solar module 110 is an array of photovoltaic panels combined with a plurality of thermal solar panels. The photovoltaic panels are converting sun light to electricity and at the same time generating extra heat. The thermal solar panels are designed to particularly generate thermal energy from sun light. The solar module 110 can be an array of photovoltaic panels, thermal solar panels, insulated glass panels, and heating pads. An air plenum structure 120 is directly coupled to the solar module 110. In another specific embodiment, the air plenum 120 is a volume of space enclosed by a bottom face of the solar module 110 and a planar pan structure commonly supported by two or more mounting rails installed on the roof 10 of the building. The air plenum 120 includes an entrance opening for collecting ambient air from building exterior space 180 and an exit opening for delivering the collected air. Through the air plenum 120 the collected airflow 121 passes by the bottom face of the solar module 110. When the solar module 110 is in operation (under light illumination 103 from sun 101), it generates substantial amount of thermal energy. The airflow passing by the bottom face would become a fluid medium for enhancing a convective cooling of the solar module by carrying out, at least partially, the thermal energy generated by the solar module. Other than help cooling the solar module via the airflow, the thermal system 100 is substantially configured to process the airflow and utilize the thermal energy carried thereof at least partially for providing integrated home utility supplies and echo air conditioning within the building.

As shown in FIG. 1, the thermal system 100 includes several processing modules for directly or indirectly utilizing the thermal energy carried in the airflows collected from the air plenum 120. In an embodiment, the thermal system 100 includes an energy transfer module (ETM) 130 for delivering thermal energy to a home/building for multiple purposes of utility supply including water heating, space heating, ventilation, and more. Particularly, the thermal solar module 130 includes an enclosed channel structure configured to be an air pathway from an air inlet 131 to an air outlet 132. The air inlet 131 is directly coupled to the exit opening of the air plenum 120 for receiving one or more airflows 351 into the channel structure. The channel structure can be made simply by a shell body using a low cost material such as sheet metal. Within the channel structure, ETM 130 includes an air filter 134 disposed after the air inlet 131. The air filter 134 is a 2-inch pleated air filter. In an example, a 2-inch thick pleated MERV 7 air filter is used, which provides air filtration rates up to 900 CFM, significantly higher than typical air filter for home furnace. The ETM 130 further includes a heat exchanger 135 after the air filter 134 for processing the one or more airflows 351 and utilize the thermal energy carried thereof. The ETM 130 uses a blower 137 disposed at downstream of the heat exchanger 135 for drawing the one or more airflows 351 in a predetermined flow rate with adjustable ranges. In a specific embodiment, the ETM 130 can be controlled by a central controller 160 via an I/O port 161 in terms of blower speed modulation to adjust the flow rate of the airflow 351. Both a temperature profile across the solar module and heat exchanging effect associated with the airflow 351 can be at least partially determined by the flow rate. Depending on outside climate and building utility supply conditions, the adjustable airflow provides a most economic utilization of solar energy generated by the solar module by providing efficient cooling effect for the solar module and thermal energy utilization for building's water heating.

In an embodiment, the heat exchanger 135 is a coil structure made by two rows of aluminum finned copper tubing. The copper tubing includes an inlet 1351 for connecting to a water pipe to receive running water into the coil structure and an outlet 1352 for delivering the water out by connecting with another water pipe. In an example, the copper tubing is a tube with ½-inch diameter. When the airflow 351 drawn by the blower 137 passes by the coil structure, the thermal energy carried in the airflow can be transferred to the copper tubing, thereby heating the running water therein. The water pipes are connected between the heat exchanger 135 and a water tank (not shown). As the result, all water in the water tank can be heated. Therefore, the heat exchanger 135 is able to extract at least a portion of the thermal energy carried in the airflow 351, which can be utilized for providing hot water supply for the building. As the heat exchanger 135 processed the incoming airflow 351 to deliver a portion of the thermal energy for water heating, it outputs airflow 352 carried remaining portion of the thermal energy to the downstream. The airflow 352 should be further utilized in one or more ways by the thermal system 100 for additional home energy supply or air conditioning usage, as described in further detail throughout the specification and more specifically below.

Referring to FIG. 1, the thermal system 100 also includes an air conditioning module 140 comprising a channel structure configured to a second air pathway between a second air inlet 141 and a second air outlet 142 disposed next to the channel structure associated with the ETM 130. The second air inlet 141 is coupled to internal space 181 of the building via a duct. Airflow 353 can be collected from internal space 181 of the building which usually needs to be reconditioned to have lower humidity and lower temperature, especially in hot and humid summer season. The air conditioning module 140 further includes another heat exchanger 147 disposed downstream within the channel structure for cooling the air and an air processing medium disposed upstream for pre-conditioning the airflow entering the heat exchanger 147. In a specific embodiment, the heat exchanger 147 is an evaporative cooler using water as its coolant. Although many other types of coolers can be used, the water-based evaporative cooler is most environmental friendly and well fit in the thermal system 100 to integrate echo air conditioning function with other home utility supply functions by utilizing substantially full aspects of solar power generated by the solar module 110. Before being cooled by the evaporative cooler 147, the airflow 353 is firstly processed by an air processing medium 151 to form airflow 354 with substantially reduced humidity. In other words, the air conditioning module 140 uses a two-stage air-conditioning process to treat the air in the interior space 181 of the building. In a preferred embodiment, a first stage is a process for pre-conditioning the airflow before a second stage process for cooling the pre-conditioned air using the evaporative cooler. The pre-conditioning process uses an air processing medium including a desiccant material to process the incoming air and is a low-energy process configured to utilize solar energy self-generated by the integrated thermal system 100. More details can be found in following sections and throughout the specification.

Referring to FIG. 1 again, the thermal system 100 includes further a movable device 150 coupled to both the energy transfer module 130 and the air conditioning module 140. The movable device 150 includes a fixture frame disposed across the channel structures associated to both ETM 130 and module 140. Within the fixture frame, a movable member is configured to hold an air processing medium 151 so that it can be alternatively exposed in both channel structures. In an embodiment, the air processing medium 151 is a desiccant material and the movable member can be a wheel-like structure in a continuous cycle movement that carries the desiccant material 151 to partially appear in the channel structure associated with the module 140 in the cycle and partially appear in the channel structure associated with ETM 130 in the same cycle. When a cycle is completing one period the desiccant material 151 can be fully exposed to each channel structure. In one or more embodiments, the desiccant material 151 can be one solid material selected from Silica gel, sodium (or potassium, or calcium) crystalline hydrated aluminosilicates, Activated Clay (Montmorillonite and Bentonite Clay), or liquid material such as water lithium chloride solution.

Because of high affinity of the desiccant material to water vapor in its surroundings, this movable mechanism is used to utilize thermal energy of an airflow in one channel structure for achieve dehumidification effect to another airflow in another channel structure. When a portion of the desiccant material 151 is exposed to airflow 353 in the channel structure associated with the module 140, provided it in a relative low humidity, the portion of the desiccant material 151 quickly absorbs moisture in the airflow 353. As the airflow 353 passes by, it becomes substantially drier airflow 354 which would ideal for the evaporative cooler 147 to handle in the second stage cooling process. Following the movable member, the same portion of the desiccant material 151 with absorbed moisture moves into the channel structure associated with ETM 130 where the desiccant material 151 is immediately exposed to the relative hot and likely drier airflow 352. The absorbed moisture in the desiccant material 151 thus can be substantially released into the airflow 352 to become a wetter airflow 355. This moisture release process re-generates the desiccant material 151 to a state with relative low humidity level so that it can be moved back, following the movable member, to the channel structure having the airflow 353 to continue the dehumidification process therein. Of course, there can be many variations, alternatives, and modifications. For example, the movable mechanism can be replaced by a timely cyclical mechanism for generating the desiccant material by guiding airflows with different relative humidity via motorized dampers and associated pathways to pass by a fixed desiccant material at different time periods. The mechanical layout for this cyclical dehumidifier using desiccant material can still be integrated both the energy transfer module 130 and air conditioning module 140, without unduly limiting the scope of the claims herein. In another embodiment, the dehumidification effect achieved by the movable desiccant material 151 in the channel structure associated with the module 140 can be controlled by adjusting the cycle rate of the movable member depending on both outside climate and interior air conditions. In certain implementation, the first stage (dehumidification) process can be skipped so that the airflow 353 can be delivered directly to the evaporative cooler 147 through a bypass channel 145. Both the movable member and a motorized damper associated with the bypass channel can be controlled by the central controller 160 to communicate with the air conditioning module 140 via an I/O port 162. More detail descriptions about the advanced controller and its operation can be found in later sections of the specification.

In one or more embodiments, the thermal system 100 is able to deliver the one or more airflows, after treatment or re-conditioning, for providing home/building space heating or cooling through one or more air outlets. In an implementation, an air outlet 132 associated with ETM 130 can guide the treated airflow 355, which either is ducted to an exhaust of the building to dump extra moistures (mainly transferred from desiccant material) outside the building or is guided as a warm air into interior space for home space heating. A motorized damper or shutter (not shown) can be applied to handle the air deliverance based on an actual home need. In another implementation, the air conditioning module 140 can operate its evaporative cooler 147 to turn the airflow 354 into airflow 356 with reduced temperature. In a specific embodiment, the evaporative cooler 147 can be configured to be an either indirect cooler using a heat exchanger or a direct cooler by passing the airflow 354 through a moisture pad. In an example, the evaporative cooler 147 includes an indirect-direct two-stage cooling method. In the first stage of a two-stage cooler, warm (but dry) airflow 354 is pre-cooled indirectly without adding humidity by passing a heat exchanger within the channel structure that is cooled by evaporation moisture on the outside of the channel structure. In the direct stage, the pre-cooled air passes through a water-soaked pad and picks up humidity as it cools. The advantage of using two-stage evaporative cooling lies in that since the air supply is pre-cooled in the first stage less humidity is needed in the direct stage to reach the desired cooling temperatures. As an example, this resulted in cooler air with a relative humidity between 50 and 70 percent, depending on the climate, compared to a traditional system that produces about 70-80 percent relative humidity air. Now a return airflow 356 is formed and can be guided back to the interior space of the building through the air outlet 142. Of course, there can be many variations, alternatives, and modifications.

In an alternative specific embodiment, the thermal system 100 can also utilize the energy transfer module 130 for executing a ventilation function. In particular, the ETM 130 can include an alternate air inlet 139, operated with a motorized damper, disposed near the air outlet 132. In an implementation, the thermal system 100 can be installed at an attic area or a specific utility room of the building. Depending on air quality of the interior space 181, the ambient air within the attic or utility room 182 could become deteriorated to alarm the central controller 160. The controller 160 can send signal to open the motorized damper and drive the blower 137 to fan the air in opposite direction within the channel structure associated with the ETM 130. The hot air in the attic area can be vented to building outside through an exit that bypasses the air plenum 120. If necessary, the air inlet 139 can be ducted to different areas of the interior space of the building for ventilation of the corresponding areas. Of course, there can be many variations, alternatives, and modifications.

Figure 2:
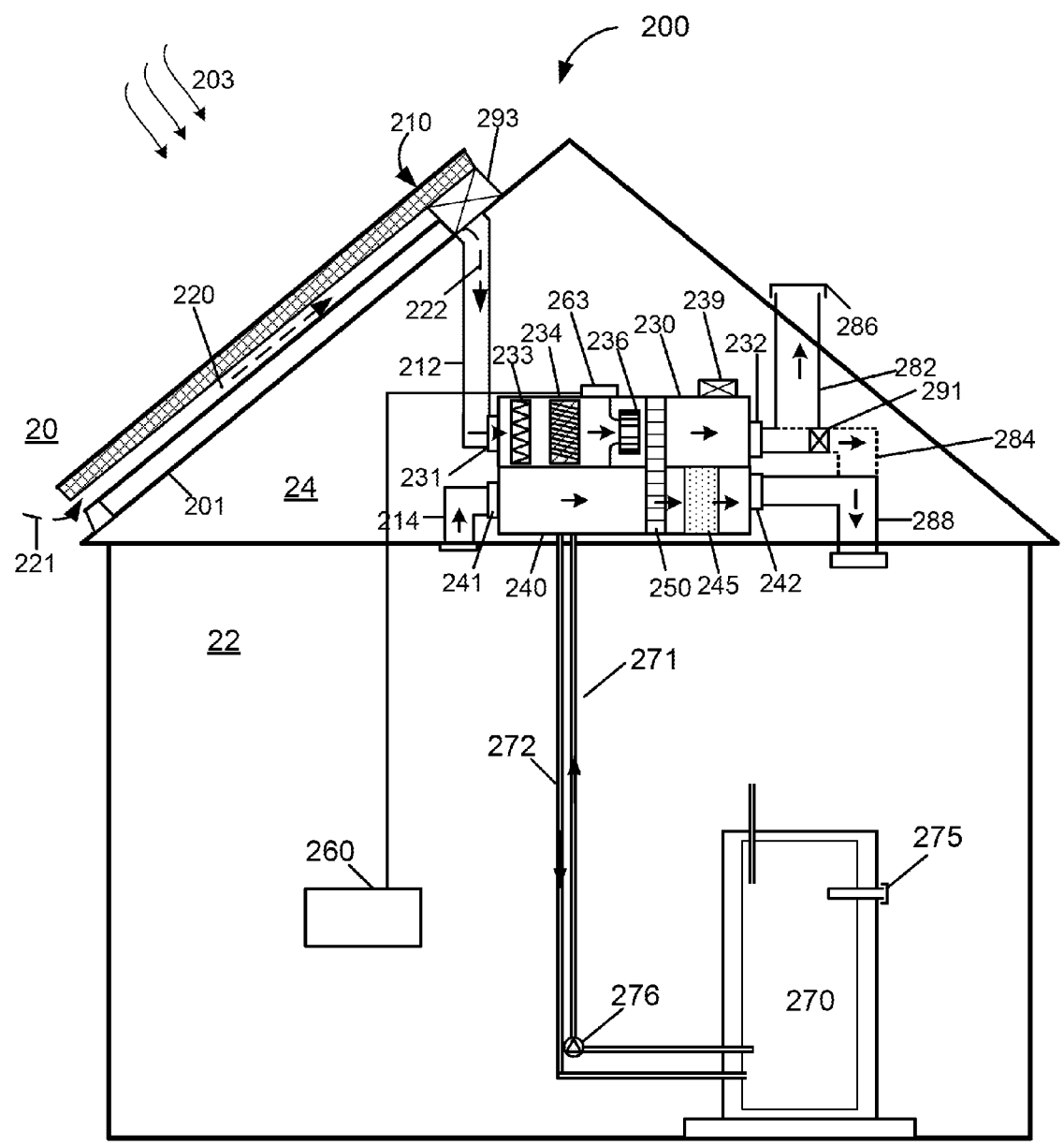
FIG. 2 is a simplified diagram of an integrated thermal system implemented at a target location according to an embodiment of the present invention.

FIG. 2 is a simplified diagram of an integrated thermal system implemented at a target location according to an embodiment of the present invention. This diagram is merely an example, which should not unduly limit the scope of the claims herein. One of ordinary skill in the art would recognize other variations, modifications, and alternatives. As shown, the integrated thermal system 200 is associated with a plurality of solar modules 210 mounted on a roof 201 of a target building using an air plenum device 220 to couple with an energy transfer module 230 for utilizing solar thermal energy for building utility supply. The thermal system further includes an air conditioning module 240 and a dehumidifier device 250 that couples both the energy transfer module 230 and the air conditioning module 240 for providing echo conditioning for interior air of the building. Additionally, the thermal system 200 includes a central controller 260 to provide automatic control for generating, processing, re-conditioning one or more air streams substantially through the integrated energy utilization process. In a specific embodiment, the plurality of solar modules 210 can be mounted on flat or tilted roof via a sloped rack fixture which supports also a pan structure under bottom faces of the solar modules to form a spatial volume of the air plenum device 220. The solar modules can be an arbitrary combination of a plurality of photovoltaic modules and one or more thermal solar modules. By receiving and absorbing sun light radiation 203, the photovoltaic modules are able to generate electricity at least partially for driving the thermal system 200 while producing extra thermal energies during their operations. The thermal solar modules are specifically configured to act as a heat source to convert electromagnetic radiation 203 to thermal energy. Combined the photovoltaic modules and thermal solar modules, the solar modules 210 has generated an amount of thermal energy that can be at least partially released through its bottom face. The air plenum device 220 thus provides a method of using one or more air streams passing by the bottom face to carry out at least a major portion of the thermal energy generated by the solar modules 210. Of course, there can be other variations, modifications, and alternatives.

In a specific embodiment, electromagnetic radiation 203 from the sun or other radiation source illuminates on the solar module 210. In one or more embodiments, solar energy is transferred through the solar module and partially turned into thermal energy which can be transferred to a working fluid such as ambient air in the air plenum 220. A collected air stream 221 from ambient 20 (outside the building) enters the air plenum 220 through an entry opening near a lower end of it and traverses in an upward direction through the air plenum 220 to pass by at least the bottom face of the solar modules 210. In a specific embodiment, the air plenum 220 has at least an exit region for delivering the air stream 222 carried with at least partial amount of the thermal energy which can be directly or indirectly utilized by the thermal system 200. Of course, there can be other variations, modifications, and alternatives.

Referring to FIG. 2, the thermal system 200 uses the energy transfer module 230 to direct couple with the air plenum 220 for processing the air stream carried thermal energy. In an implementation, the energy transfer module 230 is disposed in an interior space of the building, for example, an attic area or a utility room of the building. A first air inlet 231 is coupled to the exit region of the air plenum 220. In a specific embodiment, a flexible duct 212 is used to connect the first air inlet 231 for guiding a fluid flow or air stream 222 into an air pathway associated with the energy transfer module 230. The whole air pathway is an enclosed channel structure having a fluid flow intake region coupled to the first air inlet, a fluid flow exit region coupled to a first air outlet 231, and a fluid drive region spatially between the fluid flow intake region and the fluid flow exit region. As used herein, the terms "fluid exit region" "fluid flow intake region" "fluid drive region" and others are not intended to be limiting and should be interpreted by ordinary meaning. Also shown are a first air outlet 232 coupled to an exhaust 286 via a flexible duct 282 and optionally coupled to an entry opening to the building via a valve or a motorized damper 291. The energy transfer module 230 further (optionally) includes a second air inlet 239 disposed in the fluid exit region near the first air outlet 232. The second air outlet 239 can be operated via damper for drawing air from the building interior ambient space 24 and drive the air in an opposite flow direction for ventilation. The vented air can be released through another exhaust valve 293 to building outside. Of course, there can be other variations, modifications, and alternatives.

In a specific embodiment, the energy transfer module 230 has an air filter 233 disposed within the fluid flow intake region followed by a heat exchanger 234. The incoming air stream passes the filter 233 and encounters the heat exchanger 234 for transferring a partial portion of the thermal energy carried thereof. The energy transfer module 230 includes an air moving device 236 comprising a drive device coupled to a blower device spatially disposed within the fluid drive region. In a specific embodiment, the drive device comprises an electric motor and the blower device comprises a fan device having a centrifugal configuration operably coupled to the drive device. Of course, the electric motor can be at least partially supported by the electric power generated by the photovoltaic modules. Such blower device comprises a plurality of blades, which are configured to move high volumes of fluid and in particular air through the plenum 220 and the pathway associated with the energy transfer module 230. As shown, in a preferred embodiment, the fluid flow comprises airflow drawn from ambient space 20 outside of the building with a temperature ranging from about 32 Degrees Fahrenheit to about 200 Degrees Fahrenheit, depending on climate and solar module operation conditions.

In a specific embodiment, the heat exchanger 234 includes a coil of copper tubing terminated with an inlet port and an outlet port which respectively couple two water pipes for delivering a running water in and out therein. The air moving device 236 drives the blower to draw the air stream with a flow rate in a certain range to pass by the heat exchanger 234. The coil of copper tubing is configured in an efficient manner to capture at least partially the amount of the thermal energy carried by the air stream. The heat exchanger 234 uses the captured portion of the thermal energy to heat the running water in the copper tubing and at the same time outputs an air stream with a reduced temperature. For example, the air stream has a temperature of about 150 Degrees Fahrenheit at an entry point of the heat exchanger 234 and drops its temperature to about 100 Degrees Fahrenheit or less after passing through the heat exchanger 236. As shown, the water pipes 271 and 272 are connected between the heat exchanger 234 and a water tank 270 to respectively draw cold water (using a pump 276) in and return hot running water back. Therefore the thermal system 200 is able to fulfill at least a building utility supply function by utilizing solar energy for water heating. In an implementation depending on applications, the water heating or in particular the heat exchanging process in the heat exchanger 234 is partially controlled by the flow rate set by the air moving device 236. Through the central controller 260 and a plurality of sensing devices throughout the thermal system 200, a set of control program can be pre-input to the controller 260 (which can include a computer having a memory, a processor, and one or more interfaces for sensor data collection or control feedback, and more) to guide the drive device through an electrical box 263. The electrical box 263 can be attached to the outside of a body frame of the energy transfer module 230. For example, the electric box 263 includes a high-voltage power supply for delivering 30 VAC to 120 VAC voltage power to drive the blower device capable of providing a range of 30 to 100% flow modulation with a flow rate varied from 340 CFM to 520 CFM. The controller also is able to send one or more control signals to adjust or guide the airflow to different pathways by controlling one or more motorized dampers 291 or 293. The controller even can drive the blower reversely to draw airflow from the system installation ambient region 24 to flow in an opposite direction for ventilation, depending on information associated with both interior and exterior air conditions. Of course, there can be many variations, modifications, and alternatives.

Referring again to FIG. 2, the thermal system 200 uses the air conditioning module 240 to indirectly utilize thermal energy associated with the air stream from the air plenum 220 for processing or reconditioning interior air of the building. In an implementation, the air conditioning module 240 is disposed next to the energy transfer module 230 in the interior space 24 of the building, for example, an attic area or a utility room of the building. In a specific embodiment, the air conditioning module 240 includes a second air inlet 241 coupled to an entry opening of interior space via a duct 214. An air stream of the interior space can be drawn from the second air inlet 241 into an air pathway for reconditioning. Further, the air conditioning module 240 includes a cooler 245 for reducing air temperature and the cooled air stream can be returned through a second air outlet 242 back to the building via a duct 288. In a specific embodiment, the thermal system 200 includes a dehumidifier device 250 for pre-conditioning the air stream before delivering for the cooler 245 to cool air stream. In a preferred embodiment, the dehumidifier 250 couples to both the energy transfer module 230 and the air conditioning module 240 in order to utilize, at least partially, the thermal energy carried by the air stream in the energy transfer module 230 to achieve a dehumidification effect to the air stream in the air conditioning module 240.

In a specific embodiment, the dehumidifier device 250 includes an application of desiccant material held in a movable structure disposed across both air pathways respectively associated with the ETM 230 and air conditioning module 240. For example, the movable structure can be wheel-like structure rotary with an adjustable cycle rate. Following the rotary wheel structure, the desiccant material continuously is exposed partially to the air stream in the pathway 230 and partially to the air stream in the air conditioning module 240. With this structure and material configuration, the thermal system 200 allows the desiccant material to absorb moistures in the interior air stream (assuming at a relative high humidity) within the air conditioning module 240 due to high water-affinity of the desiccant material. When the same portion of desiccant material moves into the pathway 230 following the rotary wheel structure, the absorbed moistures can be released to the air stream with higher temperature flowing in the pathway 230. In other words, the dehumidification process for pre-conditioning the interior air stream is energetically assisted by thermal energy carried by the exterior air stream collected from the air plenum 220, in a substantially economic manner.

In the energy transfer module 230, the air stream after passing the heat exchanger 234 is still substantially warm, for example, at a temperature greater than 100 Degrees Fahrenheit. Since the air stream is originally heated by the thermal energy generated by the solar module in the air plenum 220 and loses its moisture along its way into the pathway 230, the air stream is substantially in relative low humidity level when reaching the exposed desiccant material. Therefore, the air stream in the pathway 230 is able to re-generate the desiccant material by drawing the retained moisture from the desiccant. After passing the desiccant material, the air stream, in a higher relative humidity, is still warm enough and may be guided through the first air outlet 232 to interior space 22 via duct 284 for building space heating. This is particularly applicable for target location in a dry cold winter season. Otherwise, the treated air stream can be dumped via duct 282 to building exhaust 286. This is optionally controlled by a motorized damper 291 for guiding the air stream flow.

In the air conditioning module 240, the dehumidification effect caused by the desiccant material leads a pre-conditioned air stream with a substantially low relative humidity. This pre-conditioned (dry) air stream can then be cooled using an echo-friendly evaporative cooler 245. The cooler can be a water-based evaporative cooler. In an embodiment, it is a direct one stage evaporative cooler since the incoming air stream has been pre-conditioned. Or it can be a two-stage cooler with a first stage for pre-cooling the incoming air stream without adding humidity. The pre-cooling is operated by passing the air stream through a heat exchanger within the air conditioning module 240 that evaporates moisture fully outside of the air conditioning module 240. Then a second stage is a direct exposure of the pre-cooled air stream to a water-soaked pad for further reducing air temperature while increasing humidity moderately. After the cooling, the air stream becomes substantially re-conditioned and is ready to be guided back to the interior space 22 as a return air. In an embodiment, the return air is guided through a duct 284 back to the building interior space 22. Of course, there are other variations, modifications, and alternatives.

In an embodiment, the thermal system 200 includes a plurality of sensing devices (not explicitly shown) disposed in various locations along the air plenum 220, the air pathway 230 including different flow regions, the air conditioning module 240 including regions in front of dehumidifier device 250 and behind the cooler 245, and multiple locations of interior space 22 and 24 and at least one location of exterior space 20. In a specific embodiment, the sensing devices can be a thermocouple or moisture meter or other sensing device capable of receiving information that is indicative of temperature and humidity within a vicinity of the locations where the sensing device is disposed. The thermal system 200 further includes a controller 260 coupled to the plurality of sensing devices for receiving the field and building climate information. The controller 260 is configured to generate corresponding control signals based on the received sensor information. Further the controller 260 is coupled at least to ETM 230, the dehumidifier 250, and the cooler 245 for using the control signals to start, stop, or adjust their operations for providing healthier and more echo-friendly home utility supply and air conditioning. In an example, the controller 260 can be an advanced thermostat installed at a convenient place inside the building. In a specific embodiment, the controller includes input/output for power supply, input/output for sensing devices; and input/output for control and/or feedback. As an example, the controller 260 can be a computing system, including microprocessor device, memory, and input/output drivers and the like. Of course, there can be other variations, modifications, and alternatives. Further details of the present system and related methods can be found throughout the present specification and more particularly below. A detailed description of the controller and associated functions are described more particularly below.

Figure 3:
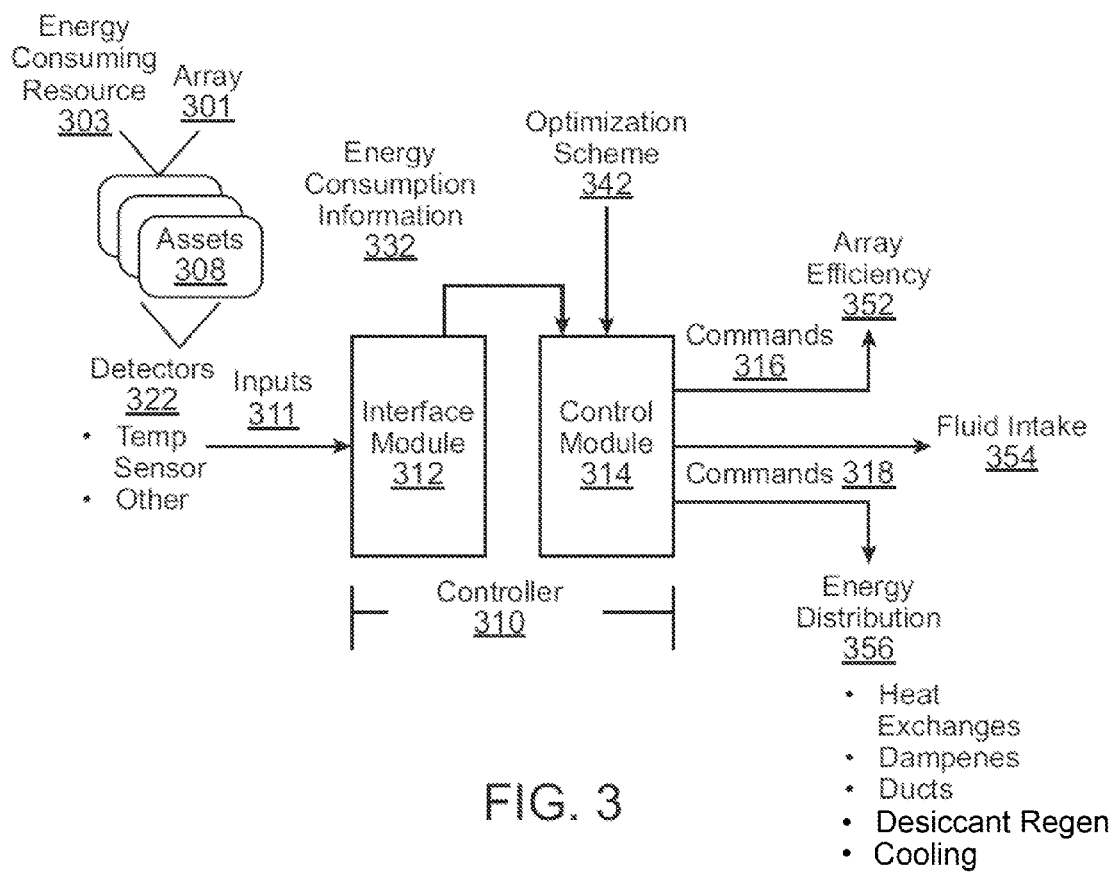
FIG. 3 is a simplified diagram of a controller hardware according to an embodiment of the present invention.

FIG. 3 is a simplified diagram of a controller hardware according to an embodiment of the present invention. This diagram is merely an example, which should not unduly limit the scope of the claims herein. One of ordinary skill in the art would recognize other variations, modifications, and alternatives. In a specific embodiment, a controller controls a solar module array and its usage at a target location, according to one or more embodiments of the present invention. In a specific embodiment, a controller may be provided in connection with installation and use of an integrated thermal system for providing healthier home utility supply. The controller may be used in connection with a hybrid solar array, in which one or more solar modules associated with the integrated thermal system serve the purpose of being a thermal energy generator. In a specific embodiment, the integrated thermal system provides for a passage of fluid or airflow in proximity to an underside of the solar modules, for the purpose of cooling individual modules while collecting thermal energy as an output from the thermal system. For example, air or other fluids may be directed in ducts or confined (or semi-confined) spaces such as air plenum structures just underneath the solar array so as to heat up from the operating temperature of individual modules in the thermal system.

As will be described, the target location where controller 310 and the corresponding integrated thermal system (such as the thermal system 200 in FIG. 2) may be installed or implemented may correspond to a building, a home or dwelling, or other structure where electricity and/or heat is used. In a specific embodiment, a controller 310 is formed from components that include an interface module 312 and a control module 314. The interface module 312 may receive inputs from various remote and local sources regarding the energy consumption of different assets 308 within the target location. In other embodiments described herein, a remote and local bus is described for such sources.

The assets 308 include energy generating assets 301 and energy consuming assets 303 (or "loads"). Energy generating assets include thermal and electrical variety, and encompass the integrated thermal system for processing the thermal energy bearing fluid. Energy consuming assets remove energy (thermal or electrical) from the fluid (e.g. air stream). Energy consuming thermal assets may correspond to, for example, interior spaces where heating needs to be provided, or sources of water that are heated (e.g. domestic hot water or swimming pool) or thermal mass components. Energy consuming electrical assets may correspond to, for example, systems that consume electrical energy (DC or AC).

In a specific embodiment, controller 310 receives input data 311 from detectors 322. The detectors 322 correspond to any equipment that ascertains the energy needs or consumption of the assets 308. These may include, for example, temperature sensors, humidity sensors, pressure sensors, gauges, meters and other equipment. As described with other embodiments, a local bus may connect the controller 310 to the detectors to receive the input data 311. In another specific embodiment, the input data 311 is received in real-time, or as feedback to control implementations.

The interface module 312 may communicate energy consumption information 332 to the control module 314. The control module 314 may be equipped with programming or other logic to implement commands 316, 318, or other controls. In a specific embodiment, the commands 316 or 318 may include device commands, and thus may take form in mechanical transformation or action.

In a specific embodiment, the control module 314 uses the energy consumption information 332 in controlling devices that affect the efficiency of the integrated thermal system, for example, the thermal system 200 shown in FIG. 2. These devices may include, for example, a blower or other mechanism 352 that directs airflow underneath the modules of the solar array. For example, the blower may accelerate or decelerate airflow (or other fluid flow) within the integrated thermal system for processing the corresponding airflow. As an alternative or addition, the devices that effect the efficiency of the integrated thermal system may include electromechanical control of fluid speed or flow rate (assuming fluid may be something other than air), or ventilation input (fluid is air). In a specific embodiment, the control module 314 determines a range of efficiency for operation of the system based in part on the energy consumption information 332.

As an alternative or addition to affecting the efficiency of the integrated thermal system, one or more embodiments may provide that the control module 314 controls the intake 354 of thermal output from the system. In a specific embodiment, the integrated thermal system heats fluid through an air plenum structure under a combination of photovoltaic and thermal modules. The rate and manner in which the heated fluid (e.g. hot air) is taken into one or more energy distribution modules of the target location may be affected by the control module 314, based in part on determinations made from the energy consumption information 332.

Still further, the control module 314 may configure the manner in which energy (both thermal and electrical) is distributed through the thermal system of the target location. In particular, one or more embodiments provide that the control module 314 selects amongst energy consuming assets to service in a given duration with either heat or electrical output. The selection may optionally be based on one or more optimization schemes 342, as well as other criteria such as usage rules. The usage rules may dictate, for example, common sense measures, such as avoid heating the pool on cold days, or save high-electrical loads for non-peak hours, or save dehumidification process using bypass channel when interior air in low humidity level. The usage rules may also dictate preferences or other measures that are known to accommodate a specific goal. In more detail, the optimization scheme 342 may also be in the form of rules, but factor a primary goal or set of goals as criteria. In a specific embodiment, the optimization scheme 342 may factor cost-saving criteria, so as to minimize the cost of energy consumption at the target location. As such, the optimization scheme 342 may factor in, for example, what assets 308 are services at a given time of the day based on the amount of irradiance that is present or expected, as compared to the cost of using energy from a utility source in that same period.

In order to implement the optimization scheme 342 and various rules as to how energy (thermal or electrical) is distributed, one or more embodiments provide that the control module 314 has access and control of energy distribution equipment 356. These may include, for example, heat exchanges that receive heated fluid and consume heat there from, ducts, dampers, blowers/fans, evaporative cooler, and desiccant regeneration, for moving air or other fluids. Such controls may be provided as an alternative or addition to the control of components that, for example, push or otherwise direct airflow within the integrated thermal system.

In a specific embodiment, the controller 310, or portions thereof, is implemented in the form of a dedicated device that is mounted or otherwise placed in position to receive on-site electrical consumption information 332. Thus, for example, the controller 310 may be implemented in the form of a box, through hardware, firmware or software that directly communicates with, for example, temperature sensors and other equipment. In another specific embodiment, however, the controller 310 may be implemented on a computer, such as on a personal computer (desktop machine, laptop, small-form factor device, etc.) or a microcontroller. Still further, the controller 310 may be distributed, in that logic comprising the controller 310 or its modules may be distributed over multiple machines or devices, and/or at multiple locations.

Figure 4:
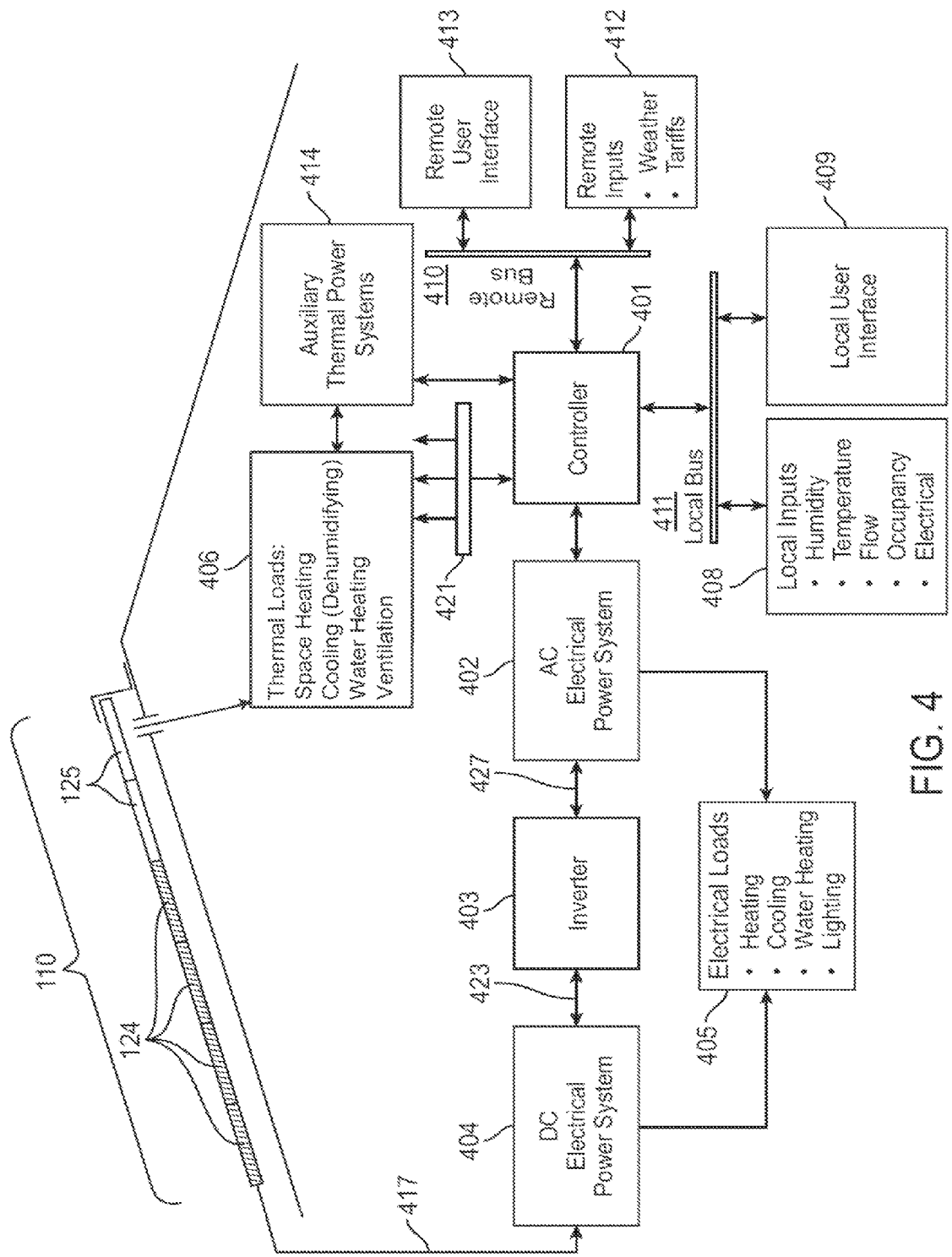
FIG. 4 is a schematic diagram of a controller configured on a thermal system for providing integrated home utility supply according to an embodiment of the present invention.

FIG. 4 is a schematic diagram of a controller configured on a thermal system for providing integrated home utility supply according to an embodiment of the present invention. This diagram is merely an example, which should not unduly limit the scope of the claims herein. One of ordinary skill in the art would recognize other variations, modifications, and alternatives. As shown, a thermal system includes a controller 401 and control equipment 421 which combine to manage distribution and use of thermal energy output from the solar modules to any one or more thermal loads 406. The control equipment 421 includes hardware, firmware and/or software that is controllable by controller 401. As described with an embodiment of FIG. 2, examples of control equipment 421 include (i) equipment that causes airflow within the thermal system (e.g. blower 204), (ii) sensors, including temperature sensors (e.g. sensor 251), for reading information about incoming fluid or information about fluid downstream in usage by the system, (iii) heat exchanges, and (iv) dampeners and other equipment for directing fluid internally. Additionally, the controller 401 may be configured to interface with electric power systems, thermal components, user data, and a wide range of inputs within the thermal system and the target location of the system.

In an embodiment, the system produces electrical power 417 from the PV modules which is fed into the DC Electrical Power System 404. The DC electrical power system 404 outputs DC power 423, which may then be fed either directly into electrical loads 405 that can operate on DC power, or to an alternating current inverter 403. The inverter 403 may convert DC power 423 to AC power 427. The AC power 427 may be supplied to the AC electrical power system 402. The AC power 427 may then be fed either directly into electrical loads 405 that can operate on AC power, or back onto the utility grid. The DC electrical power system 404, Inverter 403, and AC electrical power system 402 may be interfaced with the Controller 401. Depending on the inverter capability, information regarding both DC 404 and AC 402 electrical power systems may be queried by the controller 401 from the inverter 403. Alternately, transducers may be placed on the DC electrical power system 404 or AC electrical power system 402 to determine electrical production from the system, or consumption from the various electrical loads 405.

The controller 401 also interfaces to the thermal loads 406 including space heating, cooling (and dehumidifying), water heating, and ventilation modules and auxiliary thermal power systems 414 such as boilers, furnaces, dehumidifier, evaporator, air conditioners, heating elements, heat exchanger, and other devices that can supply the thermal loads 406 in tandem with the thermal system.

Local inputs 408 may include, for example, humidity, temperature, flow rates, occupancy of the structure, electrical demand, and other information of a nature local to the structure that can assist in the ability to optimize system performances and load management through appropriate control strategies. The system may also have a local user interface 409 for direct communication with the controller 401 or interfaced devices such as the inverter 403, electrical power systems 402, 404 and auxiliary thermal power systems 414.

A remote data bus 410 enables communication of all remote inputs and remote user interface through any remote communication protocol. Examples of the remote communication protocol include wired and wireless Ethernet, mobile phone networks, satellite, and other communication protocols. A local data bus 411 provides the communication path for local inputs 408 and user interface 409 to the controller 401 and between devices. It may be possible that both the remote and local bus 410, and 411 use the same communication protocols. Either bus 410 or 411 may consist of one or more protocols operating in tandem to establish communications with separate devices.

According to an embodiment, a dedicated remote input 412 may be provided for the remote bus 410 to enable access to information such as weather data or tariff rates of utilities. The remote inputs 412 may provide an automated and programmatic mechanism to provide such information to controller 401 along with other relevant information.

Still further, one or more embodiments provide for other types of data to be accessed or provided to the controller 401 through the remote user interface 413. The remote user interface 413 may allow the user to enter data or parameters into the system controller or other devices in communication with the controller 401.

Figure 5:
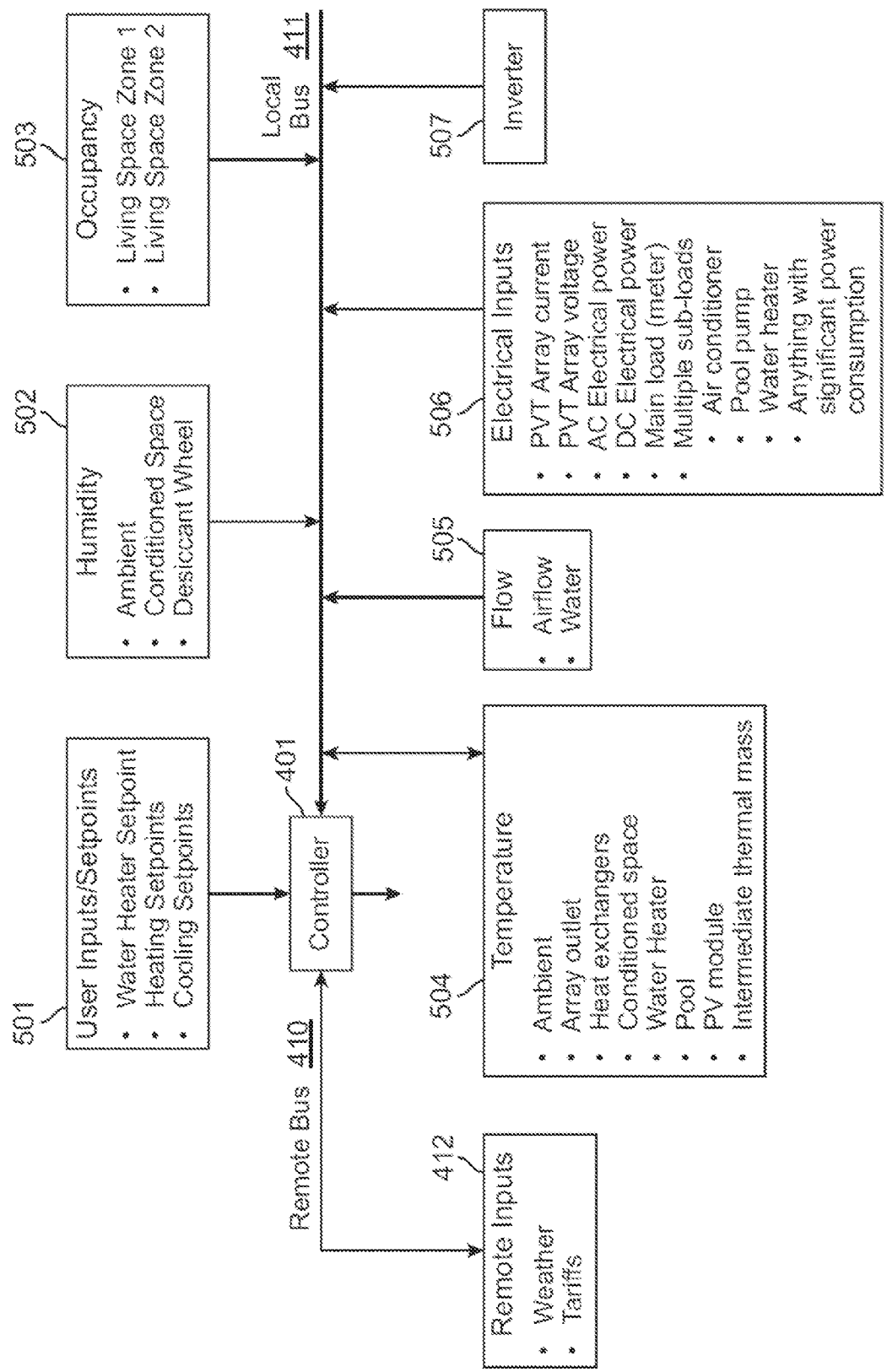
FIG. 5 is a simplified block diagram of different input components that are controllable by a controller, according to one or more embodiments of the present invention.

FIG. 5 is a simplified block diagram of different input components that are controllable by a controller, according to one or more embodiments of the present invention. This diagram is merely an example, which should not unduly limit the scope of the claims herein. One of ordinary skill in the art would recognize other variations, modifications, and alternatives. With reference to an embodiment of FIG. 4, controller 401 can receive many inputs from a variety of local sensors and through the remote and local busses 410 or 411. Access to system data and information may be relevant to the ability to create control strategies and algorithms that optimize system performance. As described, the inputs may be in the form of information, including User Inputs/Setpoints 501, humidity input 502, occupancy information 503, temperature information 504, flow information 505, electrical inputs 506, and inverter data 507. In an embodiment, controller 501 receives User Inputs/Setpoints 501 through the local user interface 509 or the remote user interface 513. Examples of User Inputs/Setpoints 501 may include occupancy status, water heater setpoint, heating and cooling temperature/humidity setpoints for the conditioned space, and other operational setpoints.

Humidity input 502 may be provided through sensors that are positioned to detect humidity from, for example, ambient air, the conditioned space, and/or airstreams within the thermal systems that may include thermal storage, heat exchangers, desiccant wheels or heat recovery systems.

Occupancy information 503 may be automatically sensed by ultrasonic or infrared sensors typically used in motion detectors. The structure can be divided into zones and occupancy can be reported to the controller by zone. As an alternative or addition, occupancy information 403 may be inferred from, for example, usage of appliances through a monitoring of electrical loads 405.

Temperature information 504 may be collected from various sources. One or more embodiments provide that the temperature information may be provided by measurements that are made for a determined optimal operation of the system. With reference to an embodiment of FIG. 5, the temperature information 504 includes, for example, the reporting of ambient air temperature through sensor 255 (FIG. 2), array output temperature through sensor 215 (FIG. 2), the temperature after fluid passes through heat exchangers at sensor 252 (FIG. 2), air temperature in conditioned space 221 through sensor 256 (FIG. 2), temperatures in the water heater through sensors 253 and 254 (FIG. 2), and other temperature measurements as may be required by the system.

Flow information (and/or inputs) 505 may include information that identifies or indicates the volume of air flowing through a particular duct or section of the system and the flow of liquids in hydronic loops. Flow information 505 may be in various forms, such as in the form of actual mass or volumetric flows, and/or in the form of simple on/off indicators as to whether flow exists or not.

Electrical inputs 506 include, for example, current and voltage provided by the PV modules, outputs from DC electrical power system 404 (FIG. 4), outputs from AC electrical power system 402, the main meter for the structure, and the load demand for individual or multiple sub loads 405. Examples of sub loads 405 include air conditioners, pool pumps, lighting, water heaters and/or anything with electrical power consumption to be metered.

The controller 401 may also interface with the inverter 403 to obtain operating information regarding the electrical performance of the inverter, the current and voltage characteristics of PV modules connected to the inverter 403, and the export of power from the inverter 403 to the AC electrical power system 402.

In addition, the controller 401 can receive data from remote inputs. The data from remote inputs may include, for example, weather data, energy pricing, and tariff schedules from the utility for energy. These and other data sets may be provided to the controller over the remote bus 410, user inputs 501, or potentially the local bus 411.

Figure 6:
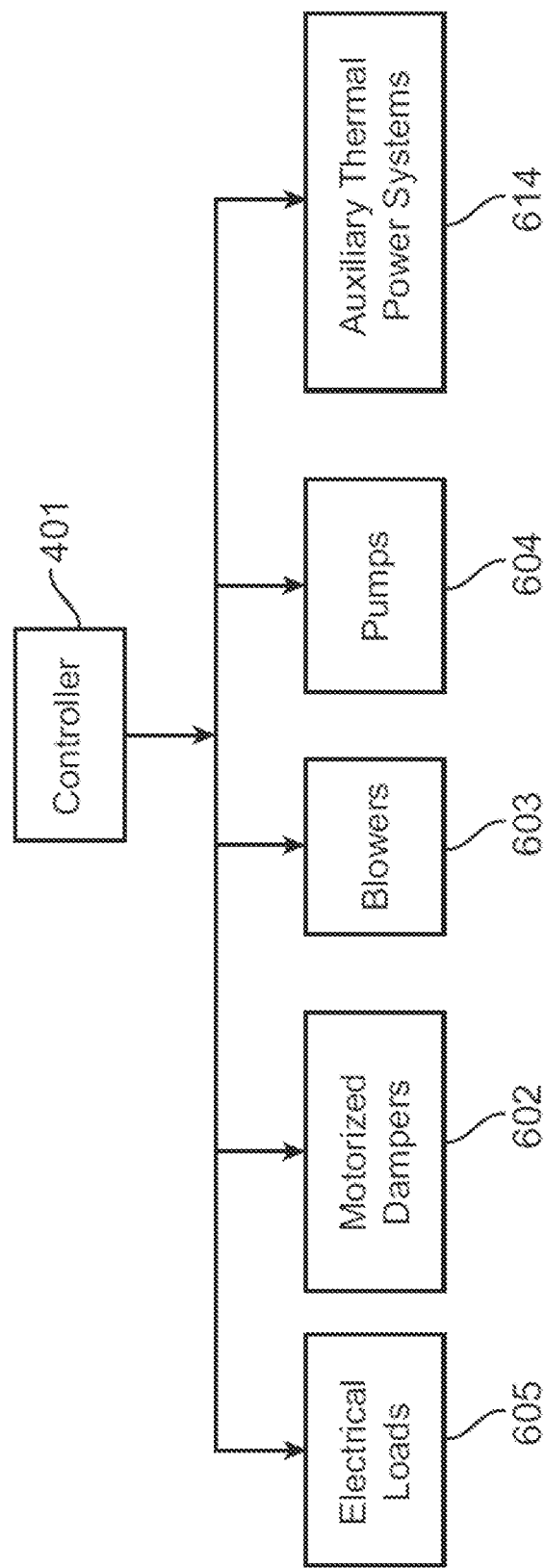
FIG. 6 is a simplified block diagram of different output components that are controllable by a controller for use as part of an integrated system for performing optimization operations, according to an embodiment of the present invention.

FIG. 6 is a simplified block diagram of different output components that are controllable by a controller for use as part of an integrated system for performing optimization operations, according to an embodiment of the present invention. This diagram is merely an example, which should not unduly limit the scope of the claims herein. One of ordinary skill in the art would recognize other variations, modifications, and alternatives. The physical elements may not only optimize generation of the integrated solar thermal system, but also facilitate or enable control and regulation of any electrical loads 605 or components of any auxiliary thermal power systems 614.

In an embodiment, controller 401 is connected to regulate or modulate any of the electrical loads 605 connected to the DC electrical power system 404 (FIG. 4) or AC electrical power system 402 (FIG. 4), as indicated by output block 605. The controller 401 may also operate any combination of blowers 603 and dampers 602 to move and direct airstreams to transfer thermal energy. Operation of pumps through output block 604 is also possible. Control over auxiliary thermal power systems 605 is also possible and allows coordination of generation from the thermal system and these backup energy modules including dehumidification device and air cooling module. The dehumidification device can be a desiccant wheel continuously rotated and alternatively exposed between two separate air streams. The air cooling module may be an evaporative cooler using water as the coolant. Additional output blocks may be provided as necessary for the controller 401 to interface with and influence any system components that may impact the generation or use of energy within the structure.

One or more embodiments provide for using controller 401 in order to implement strategies or optimization schemes for different criteria. In an embodiment, the controller 401 may simultaneously assess the demands of the various loads within the target location. These loads may include, for example, water heating, space heating, dehumidification, air cooling, ventilation, and electrical consumption. The loads may be assessed in tandem with (i) the ability of the thermal system to provide the electrical and thermal power outputs to service these loads, and optionally (ii) in connection with criteria or parameters for optimizing the electrical/thermal outputs.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A system for utilizing solar thermal energy for integrated home utility supply, the system comprising:
    an air collector coupled to a solar module disposed outside a building to collect external air carrying thermal energy generated from the solar module;
    an energy transfer module comprising a first heat exchanger disposed in a first pathway between a first air inlet and a first air outlet, the first air inlet being coupled to the air collector for receiving a first air stream carrying a portion of the thermal energy, the first heat exchanger being configured to process the first air stream and output a second air stream by carrying at least partially the portion of the thermal energy;
    an air conditioning module comprising a second heat exchanger disposed in a second pathway between a second air inlet and a second air outlet, the second air inlet being coupled to interior space of the building for drawing a third air stream characterized by a first humidity and a first temperature; and
    an air processor comprising a desiccant material coupled to both the energy transfer module and the air conditioning module, the air processor being configured to cycle the desiccant material alternatively in the first pathway located after the first heat exchanger and in the second pathway located before the second heat exchanger;
    wherein the desiccant material absorbs moisture from the third air stream in the second pathway to form a fourth air stream toward the second heat exchanger, and alternatively releases the moisture to the second air stream in the first pathway to form a fifth air stream toward the first air outlet, the second heat exchanger processes the fourth air stream to form a sixth air stream characterized by a second humidity and a second temperature towards the second air outlet, the second humidity is no greater than the first humidity and the second temperature is lower than the first temperature.

2. The system of claim 1 wherein the energy transfer module further comprises an air filter disposed in the first pathway located before the first heat exchanger and a blower disposed after the first heat exchanger.

3. The system of claim 1 wherein the first heat exchanger comprises a coil of aluminum-copper tubing filled with water cycling from a water tank.

4. The system of claim 3 wherein the first heat exchanger processes the first air stream carrying a portion of the thermal energy to utilize a partial portion of the thermal energy to heat the water in the pipe coil as well as the water tank.

5. The system of claim 1 wherein the air collector comprises a plenum structure disposed directly underneath the solar module configured to covert sun light into both electric energy and thermal energy.

6. The system of claim 1 wherein the air conditioning module further comprises a blower to draw the second air stream with a desired flow rate and a bypass channel to guide the second air stream to bypass the air processor under one or more pre-determined conditions.

7. The system claim 1 wherein the second heat exchanger comprises an evaporation cooling device using water as a work fluid.

8. The system of claim 1 wherein the desiccant material is a solid hygroscopic material selected from Silica gel, sodium (or potassium, or calcium) crystalline hydrated aluminosilicates, Activated Clay (Montmorillonite and Bentonite Clay).

9. The system of claim 1 wherein desiccant material is a liquid sorption material comprising water lithium chloride solution.

10. The system of claim 1 wherein the air processor comprises a rotary wheel structure holding the desiccant material to continuously expose the desiccant material in the first pathway within a partial cycle and alternatively in the second pathway within another partial cycle.

11. The system of claim 1 wherein the first air outlet guides the fifth air stream to the interior space of the building for space heating and optionally redirected to an exhaust.

12. The system of claim 1 wherein the sixth air stream is guided to the second air outlet as a return air back to the interior space of building.

13. The system of claim 1 wherein the solar module includes any combination of photovoltaic panels, thermal solar panels, insulated glass panels, or heating pads.

14. The system of claim 1 further comprises a plurality of sensing devices configured to measure at least temperature and humidity in a vicinity thereof disposed at least at locations including the air collector, the first air inlet, the first air outlet, the second air inlet, the second air outlet, the first heat exchanger, the second heat exchanger, front/back of the air processor.

15. The system of claim 14 further comprises a central controller configured to receive information from the plurality of sensing devices to generate input/feedback signals to control operations of the energy transfer module, the air conditioning module, and the air processor.

16. A system for utilizing solar energy for integrated building utility supply, the system comprising:

A solar module mounted over a roof of a building;

an air plenum associated with the solar module for collecting ambient air from external space of the building;

an energy transfer module comprising a first air inlet, an air filter, a heat exchanger, a blower, a desiccant medium, and a first air outlet being disposed along a first channel structure, the first air inlet connecting the air plenum for the blower to draw a first airflow of the ambient air from the air plenum carried an amount of thermal energy generated by the solar module, the heat exchanger being configured to utilize a portion of the amount of thermal energy to form a second airflow, the desiccant medium being configured to utilize at least partially a remaining portion of the amount of thermal energy in the second airflow;

an air conditioning module comprising a second air inlet, the desiccant medium, an evaporative cooler, and a second air outlet being disposed along a second channel structure, the second air inlet being coupled to internal space of the building for drawing a third airflow, the desiccant medium being configured to process the third airflow for the evaporative cooler;

a rotary device configured to continuously exposing a portion of the desiccant medium in the second channel structure and a remaining portion of the desiccant medium in the first channel structure in a periodic cycle; and a controller coupled to the energy transfer module, the air conditioning module, and the rotary device for controlling integrated utility supply of the building.

17. The system of claim 16 wherein the solar module includes a combination of one or more photovoltaic panels for generating electricity (and extra thermal energy) and a one or more thermal solar panels for generating thermal energy from sun light.

18. The system of claim 16 wherein the air plenum comprises a space volume including a bottom surface of the solar module and an entry opening for collecting ambient air to pass by the bottom surface and carry at least partial thermal energy generated by the solar module.

19. The system of claim 16 wherein the heat exchanger comprises a heat reclamation coil made from aluminum finned copper tubing including an inlet port and an outlet port respectively connected to a water tank.

20. The system of claim 19 wherein the heat reclamation coil utilizes the portion of the amount of thermal energy in the first airflow at least partially determined by a flow rate set for the blower to heat the water within the copper tubing for supplying hot-water to the building.

21. The system of claim 16 wherein the desiccant medium comprises a solid hygroscopic material.

22. The system of claim 16 wherein the portion of the desiccant medium exposed in the second channel structure within the periodic cycle continuously absorbs moisture at least partially from the third airflow to form a fourth airflow with a substantially lower humidity than the third airflow.

23. The system of claim 22 wherein the evaporative cooler processes the fourth airflow by vaporizing a water coolant to form a fifth airflow having a lower temperature than the fourth airflow, the fifth airflow being guided by the second air outlet back to internal space of the building as a re-conditioned air.

24. The system of claim 22 wherein the remaining portion of the desiccant medium exposed in the first channel structure within the periodic cycle continuously releases the moisture by utilizing at least partially the remaining portion of the amount of thermal energy in the second airflow to form a sixth airflow.

25. The system of claim 24 wherein the sixth airflow is guided by the first air outlet to an exhaust of the building and optionally to the internal space of the building for space heating.

26. The system of claim 16 further comprising a plurality of sensing devices for collecting information associated with ambient weather and building utility conditions for the controller.

27. The system of claim 26 wherein the controller comprises a thermostat configured to use the information from the plurality of sensing devices to generate at least a first control signal for operating the blower to set a flow rate and a flow direction for the first airflow, a second control signal for operating the rotary device to set a cycling rate of the desiccant medium between the first channel structure and the second channel structure, a third control signal for operating the evaporative cooler based on predetermined internal temperature and humidity settings.

28. The system of claim 16 wherein the air conditioning module further comprises a blower to draw the third airflow and a bypass channel for the third airflow to optionally skip the desiccant medium to the evaporative cooler directly depending on internal air conditions.

29. The system of claim 16 wherein the energy transfer module further comprises a third air inlet disposed in a vicinity of the first air outlet for building ventilation by reversely driving the blower to draw the first airflow in a reversed direction.

* * * * *